US00RE48174E

(19) United States
(12) Reissued Patent
Grimes

(10) Patent Number: US RE48,174 E
(45) Date of Reissued Patent: Aug. 25, 2020

(54) NON-ABRASIVE SECURE ATTACHMENT DEVICE FOR A MULTI-CART CONTROL SYSTEM

(71) Applicant: Justin Grimes, Minneapolis, MN (US)

(72) Inventor: Justin Grimes, Minneapolis, MN (US)

(21) Appl. No.: 15/981,802

(22) Filed: May 16, 2018

Related U.S. Patent Documents

Reissue of:
(64) Patent No.: 9,340,223
Issued: May 17, 2016
Appl. No.: 14/640,733
Filed: Mar. 6, 2015

(51) Int. Cl.
*B62B 3/14* (2006.01)
*B66D 3/04* (2006.01)
*B66D 3/02* (2006.01)

(52) U.S. Cl.
CPC ..... *B62B 3/1404* (2013.01); *B66D 3/02* (2013.01); *B66D 3/04* (2013.01)

(58) Field of Classification Search
CPC ..... B62B 3/1404; B66D 3/02; B66D 3/04
USPC ..... 280/33.992
See application file for complete search history.

(56) References Cited

U.S. PATENT DOCUMENTS 4,645,057 A * 2/1987 Schramme ..... B62B 3/1404 194/239
5,368,281 A * 11/1994 Skyba ..... B25B 25/00 254/217
6,406,250 B2 * 6/2002 Jaeger ..... A47F 10/04 280/33.991
2001/0051094 A1 * 12/2001 Jaeger ..... A47F 10/04 414/800
2002/0077230 A1 * 6/2002 Lull ..... A63B 21/00 482/142
2007/0272570 A1 * 11/2007 Brooks ..... A43B 5/0425 206/315.9
2008/0081750 A1 * 4/2008 Arnett ..... A63B 21/068 482/139
2009/0183347 A1 * 7/2009 Abels ..... F16B 45/02 24/599.6
2014/0200499 A1 * 7/2014 Champion ..... A61H 1/0292 602/36

* cited by examiner

*Primary Examiner* — Timothy J. Kugel
(74) *Attorney, Agent, or Firm* — Craige Thompson; Thompson Patent Law

(57) ABSTRACT

Apparatus and associated methods relate to a cinch for securing a train of nested shopping carts, the cinch having a non-abrasive cart-handle coupler for securely attaching the cinch to a shopping-cart handle of a front and/or rear cart of the train. In an illustrative example, the non-abrasive cart-handle coupler may include a soft loop of braid configured to latchedly circumscribe the shopping-cart handle. In an exemplary embodiment, the non-abrasive cart-handle coupler may include a latching hook having a non-abrasive handle-engagement surface. In some embodiments, the cinch may secure both a front and a rear cart of the train of nested shopping carts. In some embodiments, a ratcheting member may be used to tighten the cinch that secures the train of nested carts. When tightened, the train of carts may bow upwardly, elevating wheels attached to carts at both the front and rear ends of the train.

20 Claims, 10 Drawing Sheets

NON-ABRASIVE SECURE ATTACHMENT DEVICE FOR A MULTI-CART CONTROL SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of U.S. Provisional Application Ser. No. 61/949,785, entitled "Multi-Cart Control System," filed by Justin Grimes on Mar. 7, 2014 and U.S. Provisional Application Ser. No. 61/949,758, entitled "Lever Dolly for Motorized Shopping Cart," filed by Justin Grimes on Mar. 7, 2014, and U.S. Provisional Application Ser. No. 62/129,100, entitled "Multi-Cart Control System," filed by Justin Grimes on Mar. 6, 2015. The entirety of the foregoing applications are hereby incorporated by reference.

TECHNICAL FIELD

Various embodiments relate generally to a ratcheting cinch for securing a train of nested shopping carts.

BACKGROUND

Shopping carts are used at stores and malls throughout the United States and the world. Shopping carts come in various sizes and styles. Shopping carts assist shoppers who intend to purchase either a heavy item or a multitude of items. Shopping carts may have a basket supported by a wheeled base. A shopper may control the shopping cart by pushing upon a handle connected to either the basket or the wheeled base. The shopper may then use the cart to move any contents within the basket with a minimum of effort.

A shopper may obtain a shopping cart upon entry of a store or shopping center. The shopper may use the shopping cart for the duration of the shopping experience. Items which the shopper intends to purchase may be temporarily placed into the basket. After purchasing any selected items, the items may be bagged and then returned to the shopping cart. The user may then wheel the purchased items to a car parked in a parking lot adjacent to the store or shopping center. The shopper may then transfer the purchased items from the shopping cart and into the car. The empty shopping cart may then be abandoned in the parking lot. Often, an area is reserved for abandoned shopping carts.

Shopping carts may be designed to nest so as to permit a train of carts to be joined together. A store employee may return abandoned shopping carts from the parking lot to the store or shopping center.

SUMMARY

Apparatus and associated methods relate to a cinch for securing a train of nested shopping carts, the cinch having a non-abrasive cart-handle coupler for securely attaching the cinch to a shopping-cart handle of a front and/or rear cart of the train. In an illustrative example, the non-abrasive cart-handle coupler may include a soft loop of braid configured to latchedly circumscribe the shopping-cart handle. In an exemplary embodiment, the non-abrasive cart-handle coupler may include a latching hook having a non-abrasive handle-engagement surface. In some embodiments, the cinch may secure both a front and a rear cart of the train of nested shopping carts. In some embodiments, a ratcheting member may be used to tighten the cinch that secures the train of nested carts. When tightened, the train of carts may bow upwardly, elevating wheels attached to carts at both the front and rear ends of the train.

Some embodiments may relate to a cart control system for maneuvering a plurality of nested shopping carts, such as for example a front shopping cart, a rear shopping cart, and one or more shopping carts loosely nested between. In an illustrative embodiment, a first connecting end may connect to the front cart, a second connecting end may connect to the rear cart, and a tensioning assembly may connect the first and second connecting ends. For example, the tensioning assembly may be used to apply an inward force to the connecting ends, thus minimizing a separation distance between the connecting ends to tightly nest the shopping carts together. The connecting ends may include a hook and strap assembly for encircling a corresponding shopping-cart handle. In some embodiments, the tension assembly may include a handgrip for a user to apply a cinching force upon the connecting ends.

In accordance with an exemplary embodiment, the tensioning assembly may include an elongated member strung through a tension mechanism. In an illustrative embodiment, the tension mechanism may be a ratchet-type device. The tension mechanism may include a release mechanism for releasing the inward force applied to the connecting ends. In an illustrative embodiment, the release mechanism may be a release lever integrated into the tension mechanism. In some embodiments, the release mechanism may be a push-button type.

In an illustrative embodiment, the handgrip may be a D-shape. In some embodiments, the handgrip may include padding. In an exemplary embodiment, one or more of the connecting ends may be integrated into the shopping carts. In some embodiments, the elongated member may be releasably or windably integrated into the shopping carts. In some exemplary embodiments, the shopping carts may include an integrated receiver for receiving the corresponding connecting end such that the cinching force is applied to the receiver rather than directly to the shopping-cart handle. In some exemplary embodiments, the connecting ends and/or receiver may be custom to a particular shopping cart or shopping-cart handle.

Various embodiments may achieve one or more advantages. For example, some embodiments may permit for a user to maneuver a plurality of shopping carts while maintaining control of a direction and speed of each of the shopping carts. In an exemplary embodiment, a user may direct a plurality of shopping carts (e.g., 8 or more shopping carts) around one or more corners without losing control of the shopping carts. For example, each of the shopping carts may be nested tightly together between the first and second connecting ends, thus preventing any of the shopping carts from straying.

In an exemplary embodiment, a non-rigid attachment device may secure a shopping-cart handle without marring or deforming the handle when tightened. For example, a first fabric belt may loop the handle of a rearmost shopping cart and close upon a first end of the winch. In some embodiments, a second fabric belt, for example, may loop a handle of a frontmost shopping cart and close upon a second end of the winch. One of the first or second ends of the winch may attach to a braid member that threads through a ratcheting device. The user may simply pull upon a free end of the braid member to tighten the winch. When tightened, the nested shipping carts may bow so as to make airborne wheels of the front and/or rear carts. The reduction of the ground contacting wheels may facilitate the maneuverability of the nested shopping carts. A hand operated release mechanism may facilitate the release of the shopping carts once maneuvered into a desired location.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1A:
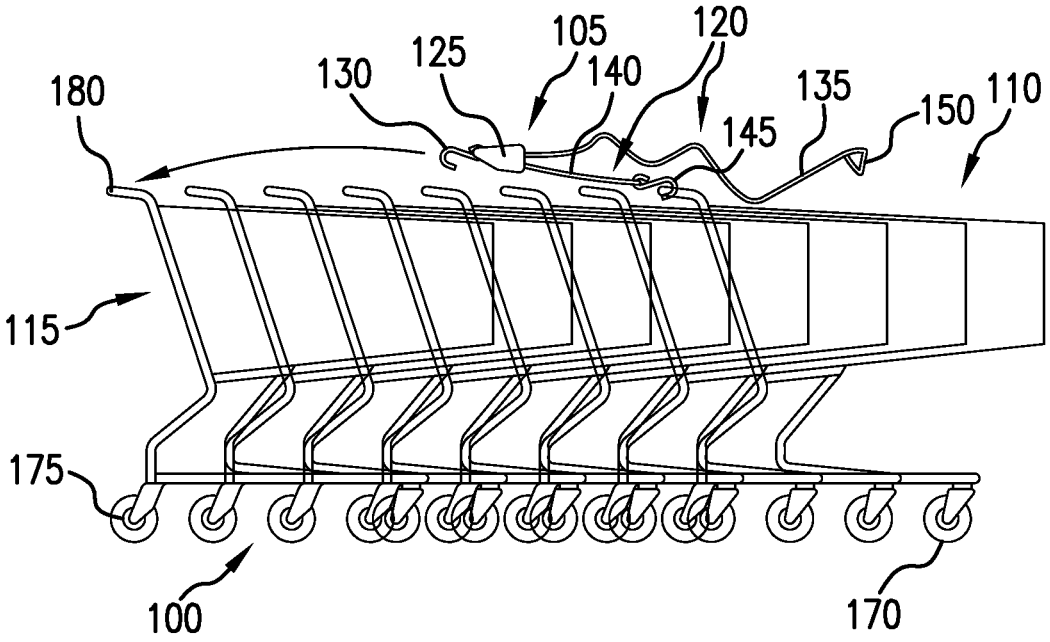
FIGS. 1A-1B depict side-elevation views of a plurality of shopping carts tightly nested together with an exemplary multi-cart control system.
Figure 1B:
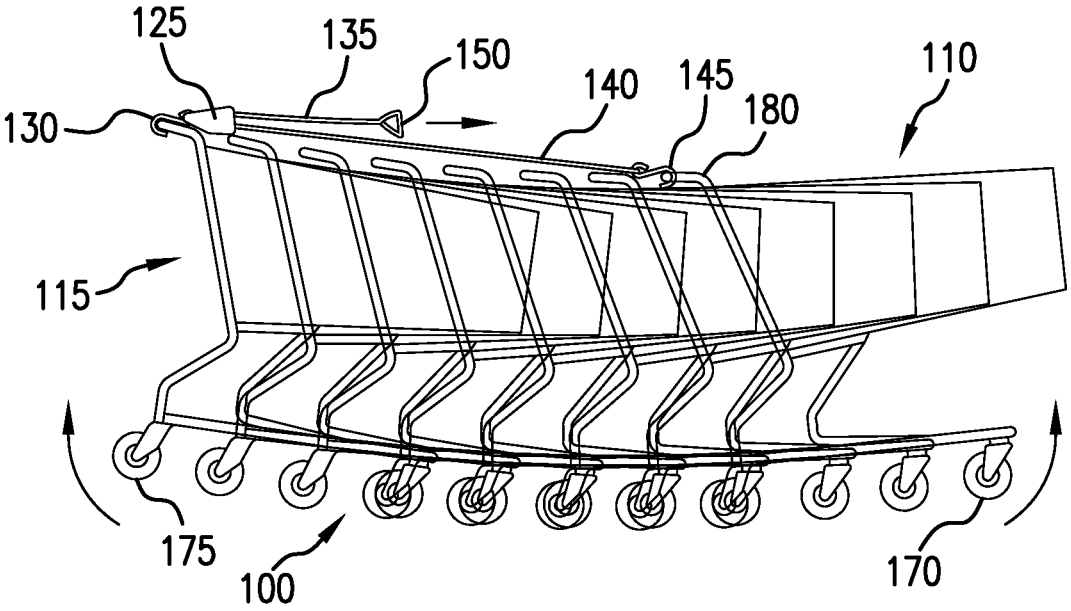

To aid understanding, this document is organized as follows. First, operation of an exemplary multi-cart control system is introduced, with reference to FIGS. 1A-1B. The disclosed operation will detail some of the advantages that accrue using such an exemplary control system. Second, with reference to FIGS. 2-3, the exemplary multi-cart control system will be described in more detail. Various exemplary components of the FIG. 1 depicted embodiment will be described. Then, with reference to FIGS. 4A-4B, various handle engagement devices will be disclosed. Next, with reference to FIGS. 5A-6C, exemplary multi-cart low-abrasive handle engagement methods will be discussed. Then, with reference to FIGS. 7A-7D, an exemplary multi-cart control system will be described. Finally, with reference to FIGS. 8-10, details of the FIGS. 7A-7D depicted system will be described.

FIGS. 1A-1B depict side-elevation views of a plurality of shopping carts tightly nested together with an exemplary multi-cart control system. In FIG. 1A, a nested train 100 of shopping carts are being secured by an exemplary multi-cart control system 105. The nested train 100 has a lead cart 110 and a caboose cart 115. The exemplary multi-cart control system 105 has a securing rope 120, a ratcheting member 125 and a coupling device 130. The securing rope 120 has a free portion 135 and a tightening portion 140. The tightening portion 140 extends from a cart-handle securing member 145 to the ratcheting member 125. The free portion 135 extends from the ratcheting member 125 to an operator handle 150. In FIG. 1A, the cart-handle securing member 145 of the securing rope 120 is coupled to a shopping-cart handle 180 of the lead cart 110. In FIG. 1B, the coupling device 130 of the ratcheting member 125 has been coupled to the shopping-cart handle 180 of the caboose cart 115. The operator handle 150 has been pulled so as to lengthen the free portion 135 of the securing rope 120. When the free portion 135 is so lengthened, the tightening portion 140 is reduced, thereby tightening the nested train 100 of shopping carts. When the nested train 100 of shopping carts is secured tightly, wheels 175 of both the lead cart 110 and the rear cart 115 are lifted above a ground surface, as shown if FIG. 1B. Lifting some of the wheels of the nested train 100 of shopping carts advantageously facilitates a mobility of the nested train 100 of shopping carts.

In some embodiments, the ratcheting member 125 has a free-rotating mode, and a ratcheting mode. When in the free-rotating mode, the securing rope 120 can move through the ratcheting member 125 in either direction. For example, when in the free-rotating mode, if one lengthens the free portion 135 of the securing rope 120, the tightening portion 140 will be commensurately reduced. And, when in the free-rotating mode, if one lengthens the tightening portion 140, the free portion 135 will be commensurately reduced. But when in the ratcheting mode, the ratcheting member 125 will permit the securing rope 120 to be moved therethrough in only one direction. For example, when in the ratcheting mode, if one pulls on the free portion 135, the tightening portion 140 will be commensurately reduced. But, when in the ratcheting mode, if one pulls on the tightening portion 140, the ratcheting member will not permit the tightening portion 140 to lengthen, and thus no reduction of the free portion 135 will result. Such a ratcheting mode may advantageously facilitate the secure maintenance of the nested train 100 of shopping carts in the bowed configuration shown in FIG. 1B with lead and caboose wheels 175 lifted above a ground surface.

Figure 2:
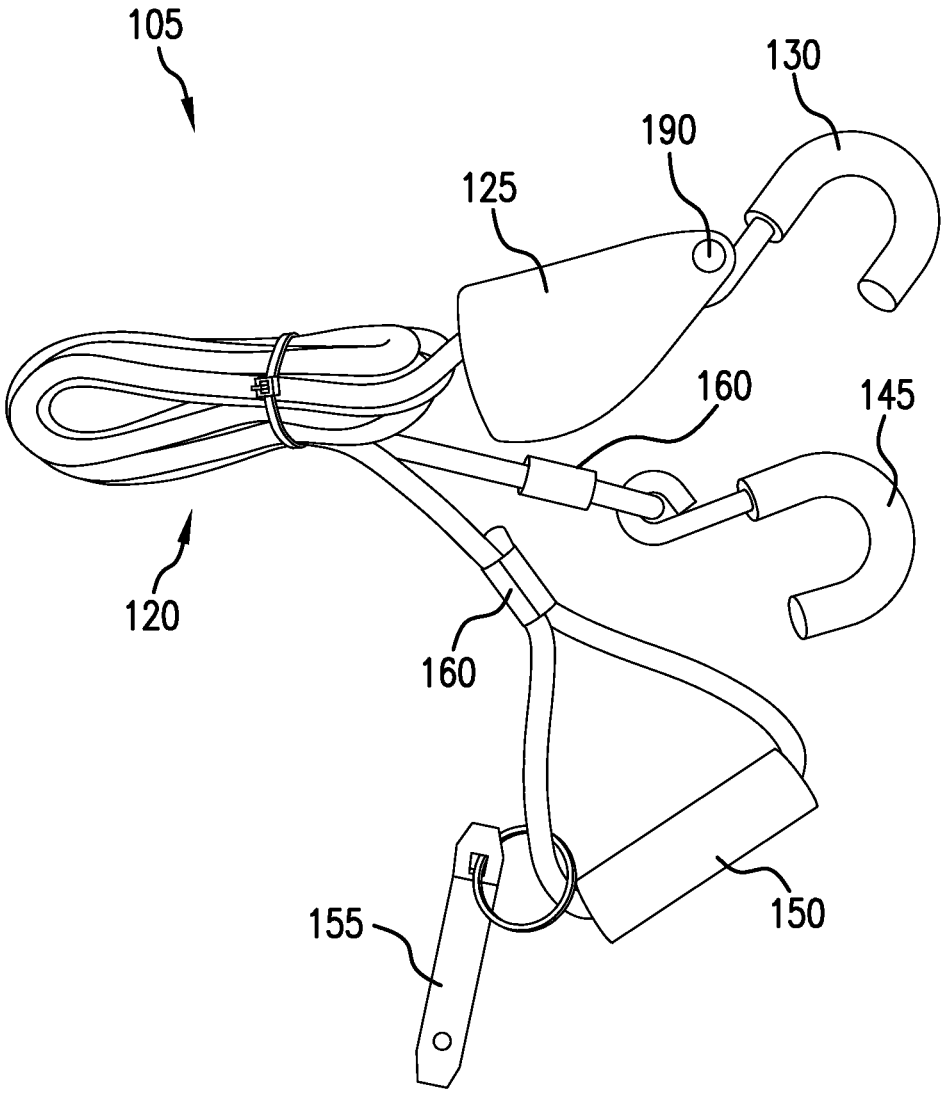
FIG. 2 depicts a perspective view of an exemplary multi-cart control system.

FIG. 2 depicts a perspective view of an exemplary multi-cart control system. In FIG. 2, a multi-cart control system 100 includes a securing rope 120, a ratcheting member 125 and a securing member 130. The securing rope 120 routes from an operator handle 150 through the ratcheting member 125, and to a securing member 145. The ratcheting member 125 delineates two portions of the securing rope 120. A free portion 135 of the securing rope 120 is defined between the operator handle 150 and the ratcheting member 125. A tightening portion 140 is defined between the ratcheting member 125 and the securing member 145. The securing rope 120 may be sized to accommodate various numbers of shopping carts in a nested train 100 of shopping carts. For example, in some embodiments, the securing rope may have a length greater than N times a pitch 185 (see FIG. 1A) between adjacent shopping carts of a nested train 100. For example, N may be 2, 3, 4, 6, 8, 10, or 13 shopping carts.

The ratcheting member 125 shown in FIG. 2, is pivotably connected to the securing member 130 via a pivoting member 190. In some embodiments, the securing member 130 may be rigidly coupled to the ratcheting member 125.

In some embodiment, a rope may couple the securing member 130 to the ratcheting member 125. In an exemplary embodiment, a chain may couple the securing member 130 to the ratcheting member 125.

Figure 3:
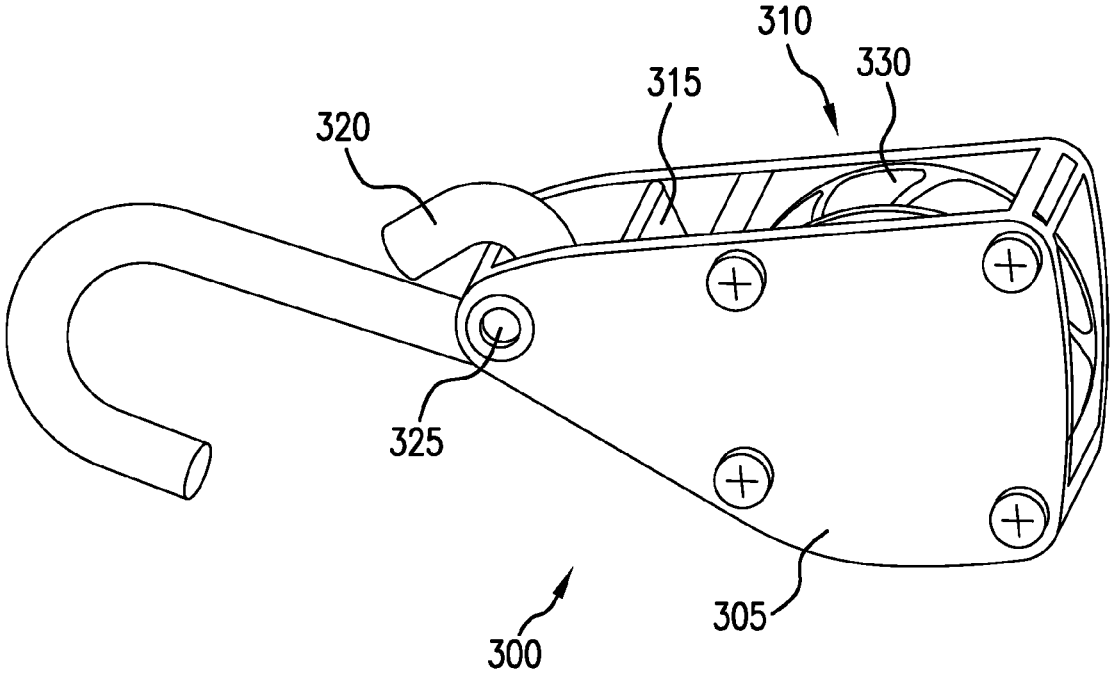
FIG. 3 depicts a perspective view of an exemplary ratcheting member of a multi-cart control system.

FIG. 3 depicts a perspective view of an exemplary ratcheting member of a multi-cart control system. The exemplary ratcheting member 300 depicted in FIG. 3 includes a body 305 pivotably coupled to a handle hook 320 via a pivot member 325. A ratcheting pulley 310 is rotatably coupled to the body 305. The ratcheting pulley 310 has a rope engagement surface 330 configured to provide a friction surface to engage a rope. The friction surface 330 may have a texture that is complementary to a texture of a rope, for example. The ratcheting pulley 310 may have a series of locking features circumferentially distributed about the ratcheting pulley 310. The locking features may engage a spring loaded locking member 315. When the locking features engage the spring-loaded locking member 315, the ratcheting pulley 310 may be prevented from rotating in a rotational direction. For example, when the spring-loaded locking member 315 engages a locking feature, the ratcheting pulley may be prevented from rotation in the counter-clockwise direction as seen from the perspective of FIG. 3.

Figure 4A:
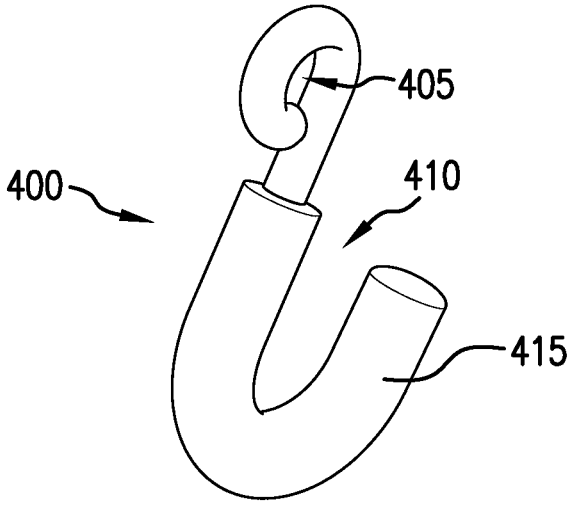
FIGS. 4A-4B depict perspective and side-elevation views of an exemplary shopping-cart connector.
Figure 4B:
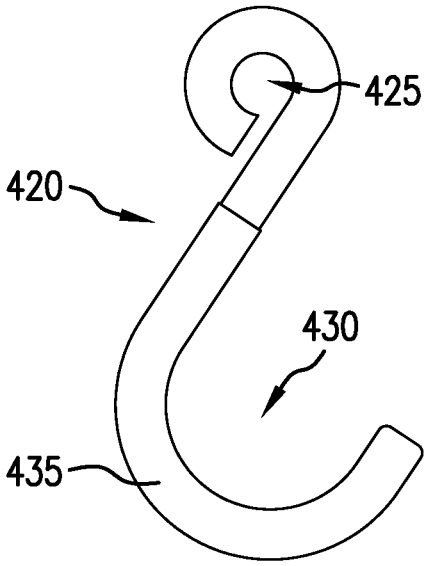

FIGS. 4A-4B depict perspective and side-elevation views of an exemplary shopping-cart connector. In FIG. 4A, an exemplary cart-engagement hook 400 includes a pivot aperture 405, a handle cushion 415 and an open engagement cavity 410. The cart-engagement hook 400 may be configured to engage a handle of a shopping cart having a predetermined geometry. For example, a round engagement cavity 410 may be configured to engage a handle having a substantially round cross-sectional profile. A square engagement cavity may be configured to engage a handle having a substantially square cross-sectional profile.

In FIG. 4B, an exemplary cart-engagement hook 420 includes a pivot aperture 425, an open engagement cavity 430 and a cushioned engagement portion 435. Various materials may be used in manufacturing the exemplary cart-engagement hooks 400, 420. For example, the hook may be made using a steel or steel alloy. In some embodiments, aluminum may be used to provide light rigidity to the cart-engagement hooks 400, 420. Various means for providing a cushioned handle interface may be used. For example, a hook 400, 420 may be dipped into a liquid bath of cushioning material. In some embodiments, a rubber or foam may provide a cushioned handle interface. In an exemplary embodiment a plastic material may provide a cushioned handle interface. In some embodiments, a woven material may provide a cushioned handle interface, for example. In some embodiments a cushioning material may be adhesively affixed to a cart-engagement hook.

Various exemplary cart-engagement hooks 420 may include various types of cushioning material. For example, in some embodiments, the cushion material may be of EPDM rubber, for example. EPDM rubber may advantageously provide UV resistance. Various cushioning materials may be chose to provide a soft cart-interfacing surface. Some cushioning materials may be pliable so as not to damage a shopping-cart handle. Some shopping-cart handles may include plastic components that may be broken if damaged (e.g., marred, dented, deformed, broken, etc.) without a cushioned hook. Various shopping carts may have various types of handle construction (e.g., plastic, tubular steel, plastic covering over steel, etc.). Some stores, for example, may print a company logo on a plastic covering. Such a company may desire that the company logo remain visible after cart use, for example. A cushioned cart-engagement hook may advantageously prevent damage to shopping cart handles.

Figures 5A, 5B, 5C:
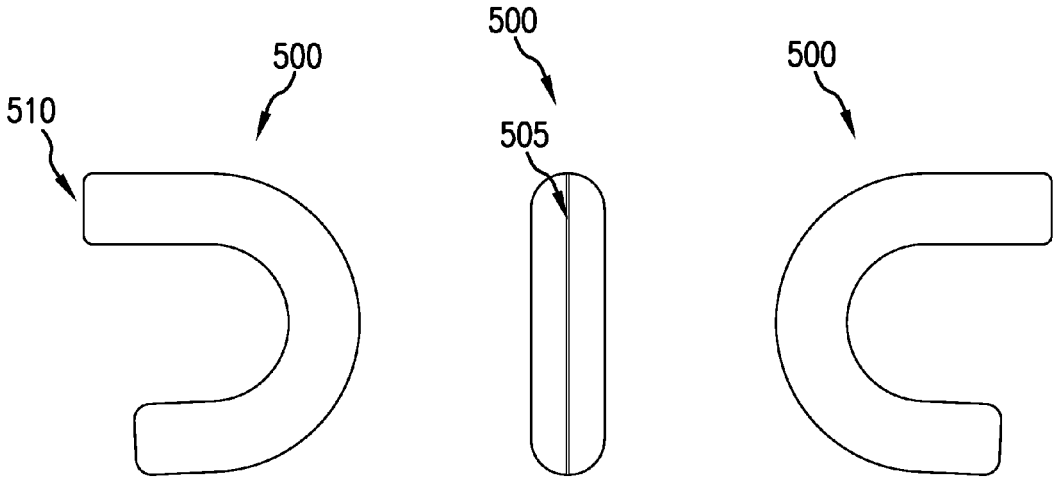
FIGS. 5A-5C depict side-elevation views of an exemplary retrofittable protective cover for a shopping-cart connector.

FIGS. 5A-5C depict side-elevation views of an exemplary retrofittable protective cover for a shopping-cart connector. In FIGS. 5A-5C, an exemplary retrofittable protective cover 500 is shown detached from a cart-engagement hook. The depicted protective cover 500 may be configured to attach to an existing cart-engagement hook. The depicted retrofittable protective cover 500 may have an interior cavity substantially congruent with a shape of a cart-engagement hook. The protective cover 500 may have a split opening 505 to facilitate an insertion of a cart-engagement hook into the interior cavity of the protective cover 500. The protective cover 500 may elastically deform during the insertion process, for example. The protective cover 500 may return to its natural form when the cart-engagement hook has been fully inserted into the substantially congruent cavity. The protective cover 500 may have an opening on one end 510 from which an end of the cart-engagement hook may emerge.

Figure 6A:
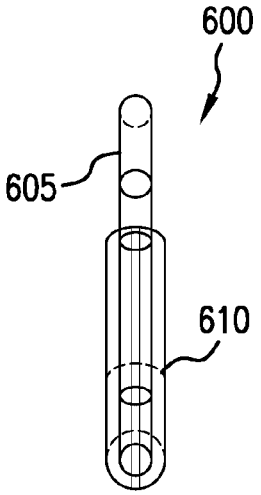
FIGS. 6A-6C depict side-elevation views of an exemplary shopping-cart connecting member with a cart-protective cover.
Figure 6B:
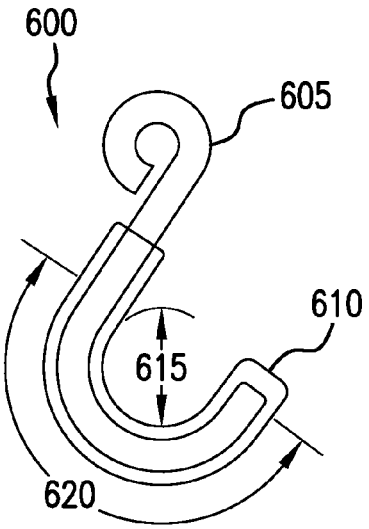
Figure 6C:
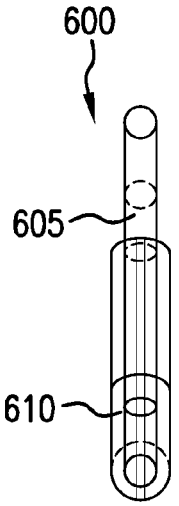

FIGS. 6A-6C depict side-elevation views of an exemplary shopping-cart connecting member with a cart-protective cover. In FIGS. 6A-6C, an exemplary cart-engagement hook 600 includes a rigid hook 605 and a handle cushion 610. The cart-engagement hook 600 has a handle engagement cavity having a predetermined opening diameter 615. The predetermined opening diameter 615 may be configured to receive a shopping-cart handle having up to a predetermined corresponding dimension. The cart-engagement hook 600 has a handle engagement portion that has an azimuthal curve 620 of a predetermined angle. In some embodiments, the azimuthal curve may be approximately 180 degrees. For example, in an exemplary embodiment, the azimuthal angle may be 160 degrees. In some embodiments, the azimuthal curve may less than 180 degrees to facilitate engagement/disengagement of a shopping-cart handle. In some embodiments, the greater than 180 degrees to prevent accidental disengagement of a shopping-cart handle. For example, in an exemplary embodiment, the azimuthal angle may be 200 degrees.

In some embodiments, a shopping-cart connecting member may include a secure hook with a protective cover. The secure hook may have a safety latch. In some embodiments, the safety latch may have an open position and a closed position. In an exemplary embodiment, a spring bias may provide a force impulse to the safety latch biasing the safety latch to the closed position. When the secure hook is affixed to a shopping-cart handle, the safety latch may advantageously prevent accidental disengagement of the shopping-cart handle. This in turn may prevent collisions between renegade shopping carts and other vehicles or persons.

Various embodiments of secure handle coupling devices have been disclosed in U.S. Provisional Application 62/129,100, entitled "Multi-Cart Control System," filed by Justin Grimes on Mar. 6, 2015. The entirety of the foregoing applications are hereby incorporated by reference. In FIGS. 2-9 of this disclosure, various embodiments of secure handle coupling devices are depicted. For example, in FIG. 3A an exemplary secure hook 135 with a protective cover includes a rigid hook 180 and a spring-biased gate 190. The secure hook 135 has an open mode and a closed mode. In the closed mode, the spring biased gate has a distal end is biased against the rigid hook 180. A shopping cart handle 110 may reside within a closed figure comprising the rigid hook 180 and the spring-biased gate 190. If the spring-biased gate 190 is forced away from contact with the rigid hook 180, the secure hook 135 is in the open mode. When in the open mode, the shopping-cart handle 110 may be inserted into or removed from the cavity, the cavity now being an open figure substantially congruent with the rigid hook 180 alone. FIG. 3B of this provisional application depicts an embodiment of a secure hook 300 having a non-abrasive covering 310.

Various means for securing a shopping cart handle may include, for example, a hook having a spring biased [gait] *gate*. In some embodiments a hook may have a gate requiring two user actions for opening, for example. In an exemplary embodiment, a handle may be securely coupled using a braid in combination with a secure capture mechanism. In some embodiments a secure capture mechanism may have a normally closed mode and a manually openable mode, for example.

Figure 7A:
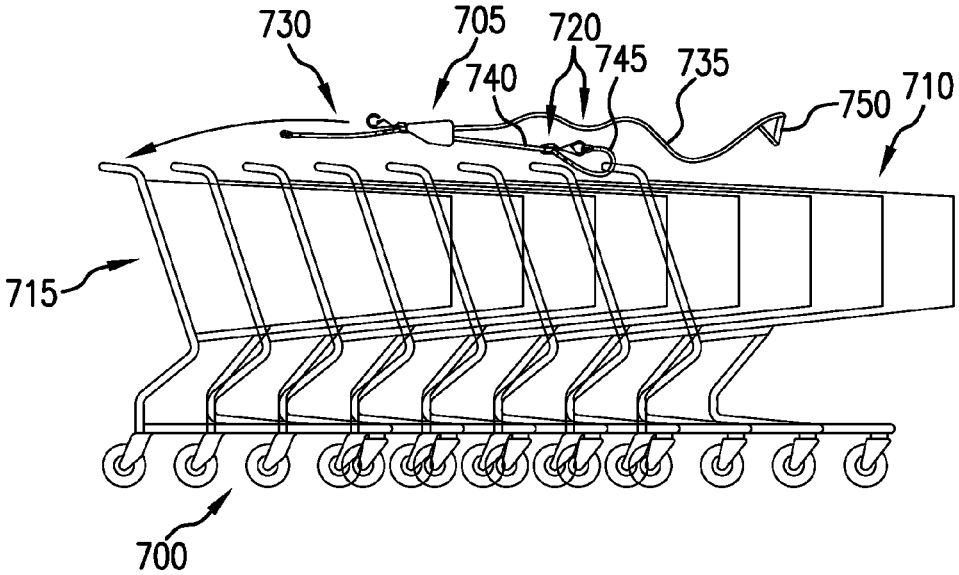
FIG. 7A depicts a side-elevation view of a plurality of shopping carts tightly nested together with an exemplary multi-cart control system.

FIG. 7A depicts a side-elevation view of a plurality of shopping carts tightly nested together with an exemplary multi-cart control system. In the FIG. 7A depiction, a nested train 700 of shopping carts is being secured by a cart-wheel-lifting apparatus 705. The nested train has a frontmost cart 710 and a rearmost cart 715. The cart-wheel-lifting apparatus 705 has a cart-securing lanyard 720 and two shopping-cart coupling members 730, 745. Each of the shopping-cart coupling members 730, 745 are configured to releasably couple to a shopping cart, one to the frontmost cart 710 and one to the rearmost cart 715. When the frontmost cart 710 and rearmost cart 715 are both secured by the shopping-cart coupling members 730, 745, the cart-wheel lifting apparatus 705 may be used to reduce the separation distance between locations coupled by the coupling members 730, 745. The distance between these coupled locations may be reduced by decreasing a length of a tightening portion 740 of the cart-securing lanyard 720. This tightening portion 740 of the cart-securing lanyard 720 may tighten in response to a user pulling an operator handle 750 attached to a free portion 735 of the cart-securing lanyard 720.

Figure 7B:
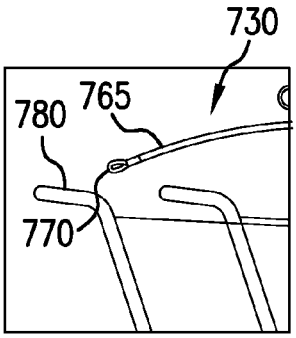
FIG. 7B-7D are side-elevation views depicting a sequence of an exemplary multi-cart control system engaging a shopping cart.
Figure 7C:
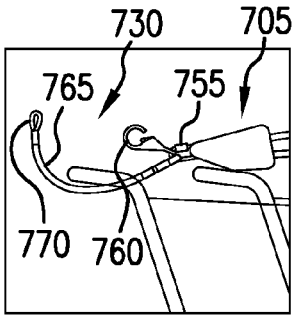
Figure 7D:
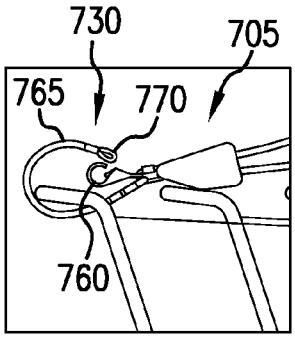

FIG. 7B-7D are side-elevation views depicting a sequence of an exemplary multi-cart-securing member a shopping cart. FIGS. 7B-7D show various still images of a sequence of connecting an exemplary cart-securing member 730 to a shopping cart 715. The depicted cart-securing member 730 includes a securing strap 765 coupled to a ratcheting member 705 via a carabiner 755. The securing strap 765 is threaded under a handle 780 of the shopping cart 715 in FIG. 7B. The securing strap 765 is then looped around the handle 780 of the shopping cart 715 in FIG. 7C. The securing strap 765 is then attaching to a strap coupling member 760 in FIG. 7D. The strap coupling member 760 is also connected to the carabiner 755, and thereby coupled to the ratcheting member 705. The shopping-cart handle 780 has been secured within a closed loop defined by the securing strap 765, the carabiner 755 and the strap coupling member 760.

Figure 8:
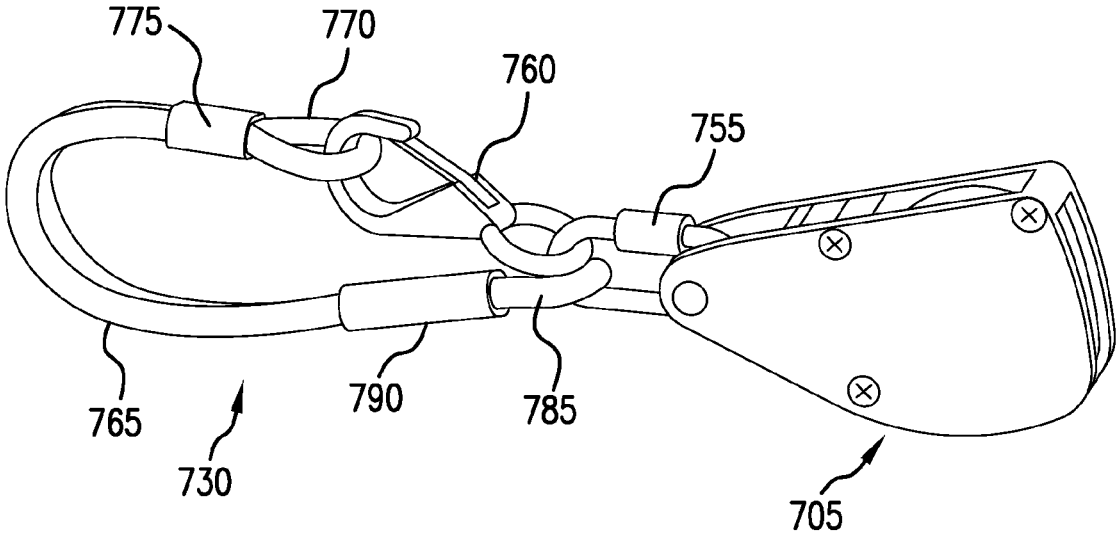
FIG. 8 depicts a perspective view of an exemplary tension mechanism with an alternate connecting end.

FIG. 8 depicts a perspective view of an exemplary tension mechanism with an alternate connecting end. In the FIG. 8 embodiment, an exemplary cart-connecting member 730 includes a double rope 765, a carabiner 755, and a [spring-gaited] *spring-gated* hook 760. The [spring-gaited] *spring-gated* hook 760 has an aperture through which the carabiner 755 resides. The [spring-gaited] *spring-gated* hook 760 has a [gait] *gate* that is spring-biased to a closed position. In the closed position, an engagement aperture forms a closed geometry. When the [gait] *gate* is pushed open, for example, the engagement aperture will form an open geometry to permit the insertion of a loop of rope, for example. The double rope 765 forms a loop 770, 785 on each of two ends. The double rope 765 is secured to itself via crimp devices 775, 785.

The crimp devices are located proximate each of the two ends. The locations of the crimp devices with respect to each of the two ends determines the size of the loops 770, 785. The crimp device 785 has a length that permits both crimping of two transversely adjacent sections of rope, but also two longitudinal sections of rope. For example, cart-connecting member may be manufactured by cutting a rope to a predetermined length. The rope may then be looped so that each of two ends of the rope are longitudinally aligned and butted together. The loop of rope may be drawn together in a lateral fashion so that a double rope results. The longitudinally aligned butted section may be centered within an uncrimped connecting device. The connecting device may then be crimped so as to secure both the adjacent longitudinal sections as well as the adjacent lateral sections of rope. Another crimping device may then laterally connect the ropes proximate another end of the loop of rope.

The double rope may have some advantageous properties with regard to coupling to a shopping cart. The double loop of rope may resists sliding transversely along a shopping-cart handle. In response to a transverse force, each transversely adjacent segment of the double rope may start to rotate about a central axis of each transversely-adjacent segment of the double rope. Such rotation may then be inhibited by interference with the adjacent section of rope. Such rotation may be inhibited by the rotationally secure crimping device coupling the two sections of double rope. Such rotation may be inhibited by a round cross section minimizing a handle engagement area. Such rotation may be inhibited by a round cross-sectional profile finding a detent feature of a shopping-cart handle and being retained in such feature. Because the double rope may provide secure engagement with a shopping-cart handle, the double rope may provide a low abrasion interface with a shopping-cart handle.

Figure 9:
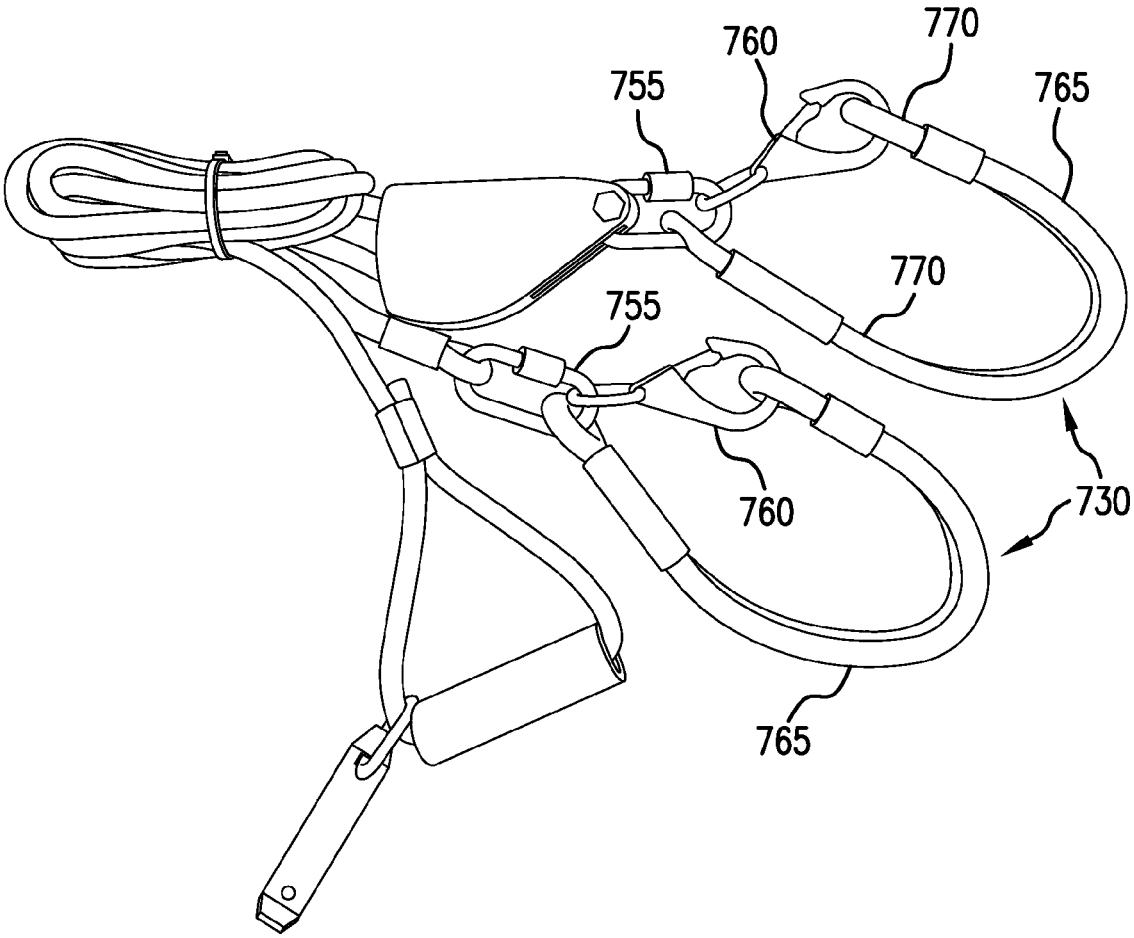
FIG. 9 depicts a perspective view of an exemplary multi-cart control system.

FIG. 9 depicts a perspective view of an exemplary multi-cart control system. In FIG. 9, an exemplary multi-cart control system includes two substantially identical shopping-cart coupling members 730. Each of the two shopping-cart coupling members 730 are shown in a coupled mode. In the coupled mode, a closed figure is defined by the double rope 765, the carabiner 755, and the latching hook 760.

Figure 10:
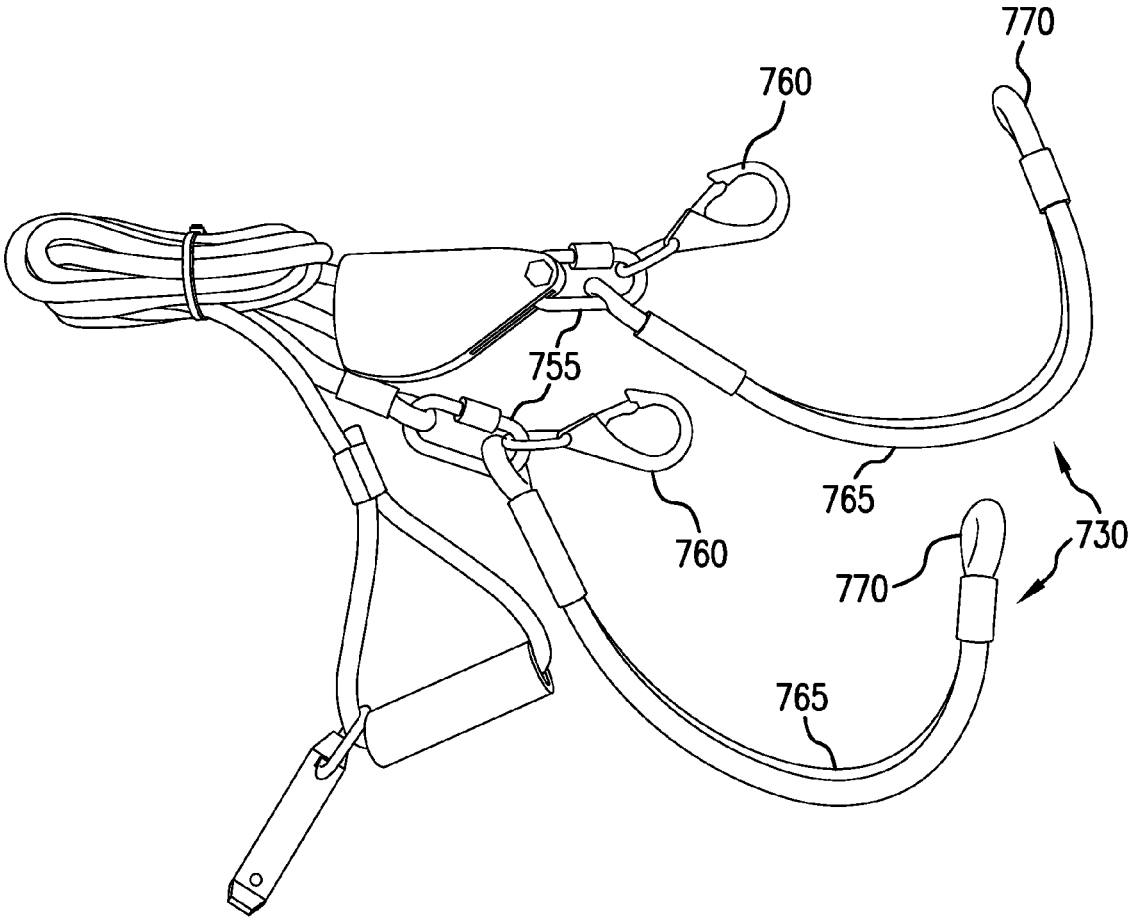
FIG. 10 depicts a perspective view of an exemplary multi-cart control system.

FIG. 10 depicts a perspective view of an exemplary multi-cart control system. In FIG. 9, an exemplary multi-cart control system includes two substantially identical shopping-cart coupling members 730. Each of the two shopping-cart coupling members 730 are shown in a coupled mode. In the coupled mode, a closed figure is defined by the double rope 765, the carabiner 755, and the latching hook 760.

In some embodiments, a secure carabiner may provide a coupling aperture to both one end of a shopping-cart coupling member and a quick-link connector. The shopping-cart coupling member may be secured to the secure carabiner via an eyelet at one end of the shopping-cart coupling member. The quick-link connector may have a closed figure aperture for secure connection to the secure carabiner. Various types of devices may be used to secure a shopping-cart coupling member to either a rope or a ratcheting device. In some instances, a carabiner may be used for such secure connection. In some embodiments, the carabiner may be opened by unscrewing a threaded [gait] *gate* member, for example. In some embodiments a two-action gate member may be used to open and close a coupling member. The secure carabiner may advantageously permit attachments that are semi-permanent. Such attachments can be removed using a two-action [gait] *gate* and/or using tools, for example. But such attachments may be inhibited against accidental removal by the two-action [gait] *gate* or the need for tools.

Although various embodiments have been described with reference to the Figures, other embodiments are possible. For example, a first connecting end may be looped around a first handle of a front shopping cart and a second connecting end may be looped around a second handle of a rear shopping cart, while a plurality of additional shopping carts are loosely nested between the front and rear shopping carts. The tension assembly may then be operated by pulling on the handgrip to increase a tautness of the elongated member extending between the first and second connecting ends. The tension mechanism may operate in a ratchet-type manner to automatically secure the elongated member in the taut position upline of the tension mechanism. In an exemplary embodiment, the elongated member is tightened until at least a front set of wheels of the front cart and a rear set of wheels of the rear car are raised above a ground surface, thus lessening a resistance of the shopping carts on the ground surface. When the shopping carts are moved to a destination, a release may be operated on the tension mechanism to loosen the taut elongated member such that the connecting ends may be removed from the corresponding shopping-cart handles.

In accordance with an exemplary embodiment, the first and/or second connecting ends may include an adjustable strap for loosening or tightening the strap around the corresponding shopping-cart handle. In some embodiments, the strap may be a rope-type. In some embodiments, the strap may be flexible. A flexible strap may present a coupling interface to a shopping-cart handle that has a large surface area. A large engagement surface may present a low abrasive interface to the shopping-cart handle. In other embodiments the strap may be rigid, such as a plastic for example. A rigid strap may be used to connect to a dedicated connection point on a shopping cart, for example. The dedicated connection point may be adapted to engage the rigid strap, for example. Such connecting members may provide secure connection and may minimize the time for connecting and disconnecting the strap to a shopping cart. In some embodiments, a ratchet-type device may be employed on each connecting end for securing the connecting end in a looped-configuration around a portion of the shopping cart, such as the shopping-cart handle for example.

In various embodiments, apparatus and methods may involve a receiver built-in or integrated into the shopping cart. In some embodiments, an aftermarket receiver may be affixed to the shopping cart for attaching the respective connecting end. In some embodiments, the receiver may be a hook-shape. In various embodiments, the receiver may be a slot or opening formed within an integral or attached support. A person of skill in the art will recognize that complementary connecting devices can be transposed between a shopping cart and a shopping cart securing system. In some embodiments, the connecting end or portion of the tension assembly may be integrated or semi-permanently secured to the shopping cart. For example, the shopping-cart handle may include a wound elongated member, such that elongated member may be released and retracted in a winch or ratchet-type manner. In some embodiments, an actuating device, such as for example a spring, may assist in retracting the elongated member.

In an exemplary embodiment, the tension mechanism may be a ratchet-type device, such that may permit one-way operation or tightening, yet permit loosening through the use of a release. In some embodiments, the release may be lever or a push-button type. In some exemplary embodiments, the tension mechanism may be a manually powered winch or spooling device. In other embodiments, the tension mechanism may be motor-driven winch. For example, the winch may include an electric motor. In some embodiments, the tension mechanism may include a locking member for locking the elongated member in a given position with respect to the tension mechanism, such as for example in a taut position. In some embodiments, the tension mechanism may be a pulley-type. For example, the elongated member may be wound around the pulley and secured upon a forward shopping-cart handle to maintain the elongated member in a taut position upline. In accordance with another embodiment, tension mechanism may include a tension gauge for assisting an operator in maintaining a safe operating tension between connecting ends.

In accordance with another embodiment, an anti-theft device may be incorporated to prevent removal of the connecting ends from the corresponding shopping carts. For example, the connecting ends may include combination or keyed lock which restricts the connecting ends from being removed from the end shopping carts and thus prevents removal of the shopping carts between the end carts because the shopping carts are in the nested position.

In an illustrative embodiment, a cinch for securing a train of nested shopping carts may include a rope comprising a substantially-zero-stretch core. The rope may have a handle coupled to a first end and a shopping-cart attachment member coupled to a second end. In some embodiments, the cinch may include a tightening member having a securing member, a ratcheting pulley and a locking member. The rope may be looped about a semi-annular portion of the ratcheting pulley separating the rope into a tightening portion and a free portion. In some embodiments, the tightening portion may be between the shopping-cart attachment member and a pulley-contacting portion. The free portion may be between the handle and the pulley-contacting portion.

In various embodiments, when the locking member is in a locked mode, the ratcheting pulley may be prevented from rotating in a first direction of rotation. A user may be able to pull on the handle to lengthen the free portion of the rope which may rotate the ratcheting pulley in a second direction of rotation and simultaneously reduces the tightening portion of the rope. In some embodiments, when the locking member is in an unlocked mode, the ratcheting pulley may freely rotate in either of the first or the second directions in response to forces imparted to the ratcheting pulley from the rope.

In some embodiments the cinch may include a flat securing strap having a length greater than a circumference of a shopping-cart handle so as to permit the flat securing strap to be looped around the shopping-cart handle and secured to the tightening member via the securing member.

In an illustrative embodiment, various means for distributing a force along a portion of a shopping-cart handle may be employed. For example, in some embodiments, the force may be distributed along an axial length of the shopping-cart handle. A flat strap having a width may distribute the force along the width. The distribution of force along the width may be substantially uniform along the width. In some embodiments, the force may be distributed radially about the handle. For example a loop of material may circumscribe all or a portion of the handle. The force may be radially distributed along an annular portion of the handle. The radial distribution may result in a lower force at a specific annular position than if the strap were connected only at that annular position, for example.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A cinch for securing a train of nested shopping carts, the cinch comprising:

a rope [having a substantially-zero-stretch core, the rope] having a first end coupled to an operator handle and a second end coupled to a first shopping-cart attachment member;

a winch module having a free-rotating mode and a ratcheting mode, the winch module including:

a winch housing;

a ratcheting pulley rotatably coupled to the winch housing, wherein the rope is looped about a semi-annular portion of the ratcheting pulley separating the rope into a tightening portion, a pulley-contacting portion and a free portion, the tightening portion being between the first shopping-cart attachment member and the pulley-contacting portion, and the free portion being between the operator handle and the pulley-contacting portion; and a ratchet-control member configured to select between the free-rotating mode and the ratcheting mode; [and]

a second shopping-cart attachment member coupled to the winch housing, each of the first and second shopping-cart attachment members having a cart-handle coupler configured to securely couple to a handle of a shopping cart, wherein, when securely coupled to a shopping-cart handle, the shopping-cart attachment member substantially circumscribes the shopping-cart handle, wherein, to remove the shopping-cart attachment member from the shopping-cart handle, a latching gate is actuated*; and,*

*a retrofittable protective cover removably enclosing at least one of the first and second shopping-cart attachment members, the retrofittable protective cover comprising a split opening that bisects the retrofittable protective cover into identically shaped right and left sides, wherein the retrofittable protective cover is form-fitted to the at least one of the first and second shopping-cart attachment members to make intimate physical contact between an inner surface of the retrofittable protective cover and an outer surface of the at least one of the first and second shopping-cart attachment members, wherein the retrofittable protective cover at least partially encloses a non-linear portion of at least one of the first and second shopping-cart attachment members, such that when at least one of the first and second shopping-cart attachment members enclosed by the retrofittable protective cover is securely coupled to an object, the retrofittable protective cover operates as a barrier between the object and the at least one of the first and second shopping-cart attachment members enclosed by the retrofittable protective cover.*

2. The cinch of claim 1, wherein each of the first and second shopping-cart attachment members comprises a hook having the latching gate, wherein the hook has a non-abrasive handle engagement surface that engages the shopping cart handle when the handle-attachment member is securely attached to a shopping-cart handle.

3. The cinch of claim 2, wherein the non-abrasive handle engagement surface comprises ethylene propylene diene monomer (EPDM) rubber.

4. The cinch of claim 2, wherein the non-abrasive handle engagement surface has a hardness durometer between 60 and 80.

5. The cinch of claim 1, wherein each of the first and second shopping-cart attachment members comprises an adjacent pair of ropes, each having a substantially circular cross-sectional profile.

[6. The cinch of claim 1, wherein each of the first and second shopping-cart attachment members comprises rope having a zero-stretch core.]

7. The cinch of claim 1, wherein each of the first and second shopping-cart attachment members comprises a carabiner and a hook with a spring loaded [gait] *gate*.

8. The cinch of claim 1, wherein the ratchet-control member has a spring biasing [a pulley-engaging] *the ratchet-control* member in the [locked] *ratcheting* mode.

[9. The cinch of claim 1, wherein the rope further comprising a braiding that covers the substantially-zero-stretch core.]

[10. The cinch of claim 1, wherein the substantially-zero-stretch core comprises polyester.]

11. The cinch of claim 1, wherein the handle is substantially cylindrical and has an axial lumen through which the rope passes.

12. The cinch of claim 11, wherein an end of the rope that passes through the axial lumen of the handle is secured the rope via a crimped member.

13. A method for reducing the number of ground-contacting wheels in a train of nested shopping-carts, the method comprising:

securely attaching a first handle-attachment member to a shopping-cart handle of a first shopping cart of a train of nested shopping carts, the first handle-attachment member coupled to a first end of a [substantially-zero-stretch] rope;

securely attaching a second handle-attachment member to a shopping-cart handle of a last shopping cart of a train of nested shopping carts, the second handle-attachment member coupled to a tightening member;

pulling a handle attached to a second end of the [substantially-zero-stretch] rope, the [substantially-zero-stretch] rope looped about a ratcheting pulley of the tightening member;

rotating the ratcheting pulley of the tightening member in response to the pulling of the handle;

decreasing a length of a tightening portion of the [substantially-zero-stretch] rope, the tightening portion being between the first handle-attachment member and a pulley-contacting portion of the [substantially-zero-stretch] rope; and decreasing a distance between the handle of the first shopping cart and the handle of the *last* second shopping cart in response to the decreasing length of the tightening portion, thereby causing the train of nested shopping carts to bow upwardly raising wheels of a front and a rear shopping cart in the train of nested shopping carts, wherein each of the first and second handle-attachment members has a non-abrasive handle engagement surface that engages the shopping cart handle when the handle-attachment member is securely attached to a shopping-cart handle, wherein the first and second handle-attachment members remain securely attached to the shopping-cart handle without a user actuating a latching device,

*wherein a retrofittable protective cover removably encloses at least one of the first and second handle-attachment members, the retrofittable protective cover comprising a split opening that bisects the retrofittable protective cover into identically shaped right and left sides, wherein the retrofittable protective cover is form-fitted to the at least one of the first and second handle-attachment members to make intimate physical contact between an inner surface of the retrofittable protective cover and an outer surface of the at least one of the first and second handle-attachment members, wherein the retrofittable protective cover at least partially encloses a non-linear portion of at least one of the first and second handle-attachment members, such that when at least one of the first and second handle-attachment members enclosed by the retrofittable protective cover is securely coupled to an object, the retrofittable protective cover operates as a barrier between the object and the at least one of the first and second handle-attachment members enclosed by the retrofittable protective cover.*

14. The method of claim 13, wherein each of the first and second [shopping-cart attachment] *handle-attachment* members comprises a hook having the latching gate, wherein the hook has a non-abrasive handle engagement surface that engages the shopping cart handle when the handle-attachment member is securely attached to a shopping-cart handle.

15. The method of claim 13, wherein each of the first and second [shopping-cart attachment] *handle-attachment* members comprises an adjacent pair of ropes, each having a substantially circular cross-sectional profile.

16. A cinch for securing a train of nested shopping carts, the cinch comprising:

a rope [comprising a substantially-zero-stretch core, the rope] having an operator handle coupled to a first end and a first coupling member coupled to a second end;

a winch module having a locked mode and an unlocked mode, the winch module including:

a winch housing;

a second coupling member attached to the winch housing;

a ratcheting pulley rotatably coupled to the winch housing, wherein the rope is looped about a semi-annular portion of the ratcheting pulley separating the rope into a tightening portion, a pulley-contacting portion and a free portion, the tightening portion being between the first coupling member and the pulley-contacting portion, and the free portion being between the operator handle and the pulley-contacting portion; and a locking-control member configured to select between the locked mode and the unlocked mode;

means for nonabrasively securing a handle of a first shopping cart of a nested train of shopping carts to the first coupling member of the cinch; [and]

means for nonabrasively securing a handle of a last shopping cart of the nested train of shopping carts to the second coupling member of the cinch*; and,*

*a retrofittable protective cover removably enclosing at least one of the means for nonabraisively securing a handle of a shopping cart, the retrofittable protective cover comprising a split opening that bisects the retrofittable protective cover into identically shaped right and left sides, wherein the retrofittable protective cover is form-fitted to the at least one of the means for nonabraisively securing a handle of a shopping cart to make intimate physical contact between an inner surface of the retrofittable protective cover and an outer surface of the at least one of the means for nonabraisively securing a handle of a shopping cart, wherein the retrofittable protective cover at least partially encloses a non-linear portion of at least one of the means for nonabraisively securing a handle of a shopping cart, such that when at least one of the means for nonabraisively securing a handle of a shopping cart enclosed by the retrofittable protective cover is securely coupled to an object, the retrofittable protective cover operates as a barrier between the object and the at least one of the means for nonabraisively securing a handle of a shopping cart enclosed by the retrofittable protective cover.*

17. The cinch of claim 16, wherein the means for nonabrasively securing a handle of a shopping cart to a coupling member of the cinch includes a hook having the latching gate, wherein the hook has a non-abrasive handle engagement surface that engages the shopping cart handle when the [handle-attachment] *coupling* member is securely attached to a shopping-cart handle.

18. The cinch of claim 17, wherein the non-abrasive handle engagement surface comprises ethylene propylene diene monomer (EPDM) rubber.

19. The cinch of claim 16, wherein the means for nonabrasively securing a handle of a shopping cart to a coupling member of the cinch includes an adjacent pair of ropes, each having a substantially circular cross-sectional profile.

20. The cinch of claim 16, wherein the means for nonabrasively securing a handle of a shopping cart to a coupling member of the cinch include a carabiner.

[21. The cinch of claim 16, wherein at least one of the first and second shopping-cart attachment members is removably enclosed in a retrofittable protective cover having a split opening.]

[22. The method of claim 1, wherein at least one of the first and second shopping-cart attachment members is removably enclosed in a retrofittable protective cover having a split opening.]

[23. The cinch of claim 13, wherein at least one of the first and second shopping-cart attachment members is removably enclosed in a retrofittable protective cover having a split opening.]

*24. A cinch comprising:*

*a first rope having a first rope first end coupled to an operator handle and a first rope second end coupled to a first attachment member;*

*a winch module having a free-rotating mode and a ratcheting mode, the winch module including:*

*a winch housing;*

*a ratcheting pulley rotatably coupled to the winch housing, wherein the rope is looped about a semi-annular portion of the ratcheting pulley separating the rope into a tightening portion, a pulley-contacting portion and a free portion, the tightening portion being between the first attachment member and the pulley-contacting portion, and the free portion being between the operator handle and the pulley-contacting portion; and,*

*a ratchet-control member configured to select between the free-rotating mode and the ratcheting mode; and*

*a second attachment member operatively coupled to the winch module and configured to securely couple to a first object, wherein the attachment member comprises:*

*a second rope extending from a second rope first end to a second rope second end, the second rope first end having a first loop and the second rope second end having a second loop;*

*a second attachment member latching hook comprising a second attachment member latching gate having a closed mode and an opened mode; and,*

*a carabiner directly coupled to the winch module,*

*wherein in the closed mode, (A) the second rope first loop is securely retained by the second attachment member latching gate of the second attachment member latching hook, such that the second rope is configured to securely couple to the first object, (B) the carabiner is directly coupled to the second rope second loop, and (C) the carabiner is directly coupled to the second attachment member latching hook,*

*wherein in the open mode, the second rope first loop is free from the second attachment member latching gate of the second attachment member latching hook to permit the rope to releasably capture the first object to which the winch is to be securely coupled,*

*wherein the first attachment member has a first attachment member coupler configured to securely couple to a second object, wherein, when securely coupled to the second object, the first attachment member substantially circumscribes the second object, wherein, to remove the first attachment member from the second object, a first attachment member latching gate is actuated.*

*25. A cinch comprising:*

*a winch module comprising:*

*a winch housing; and,*

*a ratcheting pulley rotatably coupled to the winch housing; and,*

*an attachment member operatively coupled to the winch module and configured to securely couple to an object, wherein the attachment member comprises:*

*a rope extending from a first end to a second end, the first end having a first loop and the second end having a second loop;*

*a latching hook comprising a latching gate having a closed mode and an opened mode; and,*

*a carabiner directly coupled to the winch module,*

*wherein in the closed mode, (A) the first loop of the rope is securely retained by the latching gate of the latching hook, such that the rope is configured to securely couple to the object, (B) the carabiner is directly coupled to the second loop, and (C) the carabiner is directly coupled to the latching hook,*

*wherein in the open mode, the first loop of the rope is free from the latching gate of the latching hook to permit the rope to releasably capture the object to which the winch is to be securely coupled.*

*26. The cinch of claim 25, further comprising a first crimp device operatively coupled to the first end of the rope and a second crimp device operatively coupled to the second end of the rope.*

* * * * *